Figure 1:
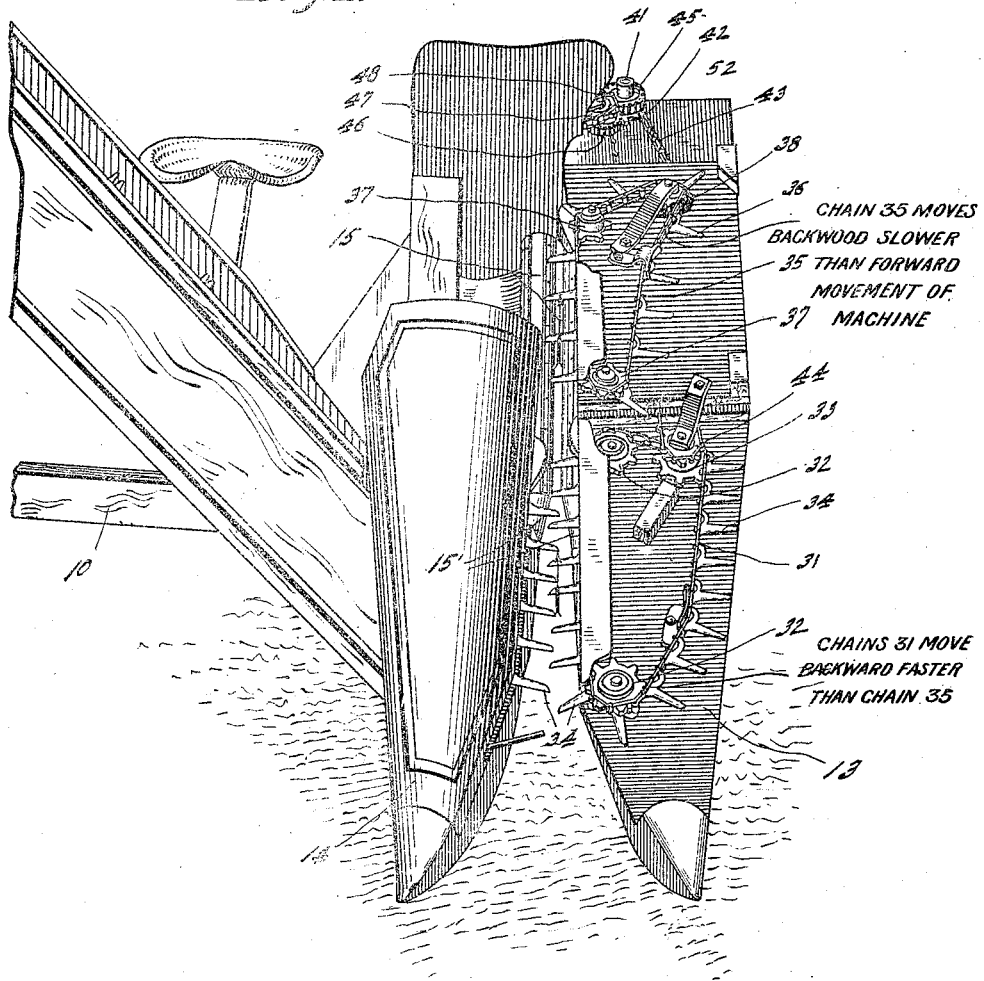

B. J. KAULL.
CORN PICKER.
APPLICATION FILED APR. 27, 1911.

1,023,320.

Patented Apr. 16, 1912.

2 SHEETS—SHEET 1.

Witnesses
Frank A. Fahle
May Layden

Inventor
Burt J. Kaull,
By Bradford Hood
Attorneys.

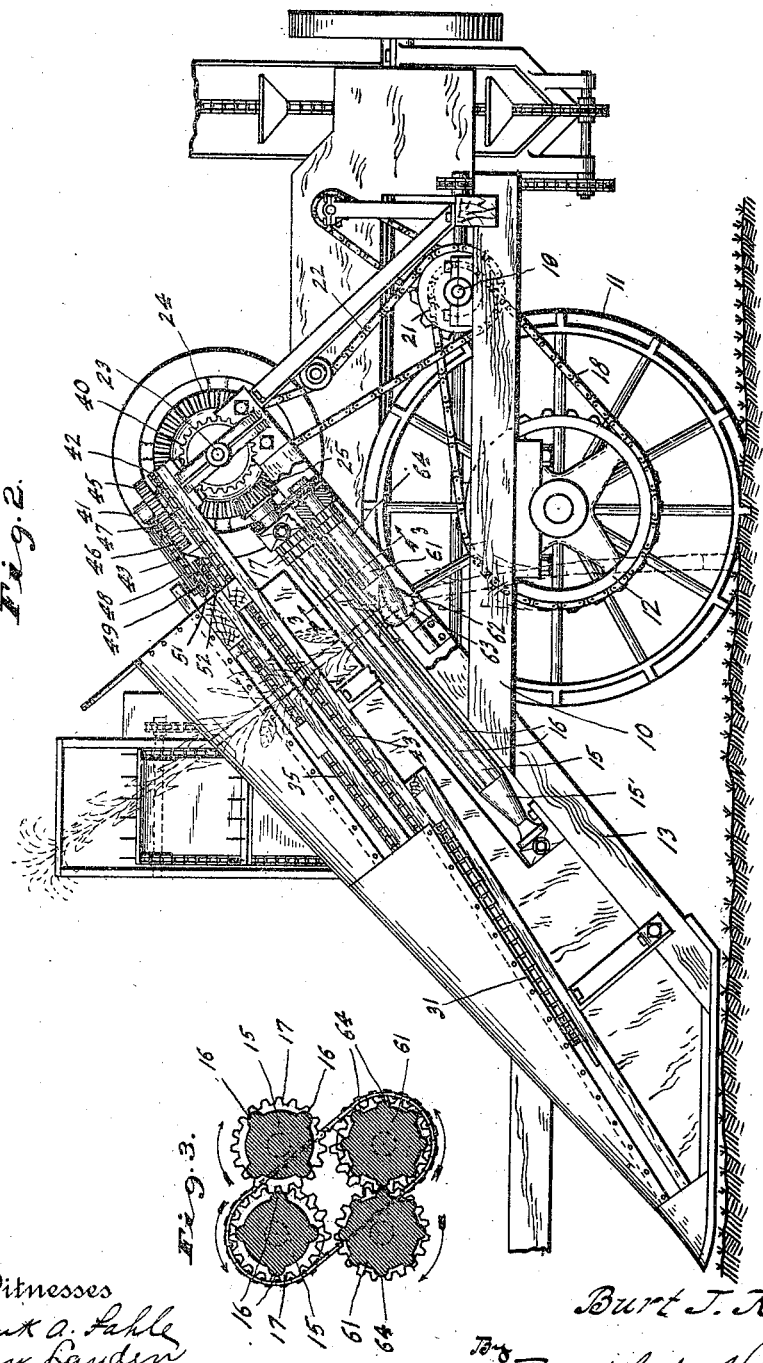

UNITED STATES PATENT OFFICE.

BURT J. KAULL, OF LA FAYETTE, INDIANA.

CORN-PICKER.

1,023,320.  Specification of Letters Patent.  Patented Apr. 16, 1912.

Application filed April 27, 1911. Serial No. 623,562.

*To all whom it may concern:*

Be it known that I, BURT J. KAULL, a citizen of the United States, residing at La Fayette, in the county of Tippecanoe and State of Indiana, have invented a new and useful Corn-Picker, of which the following is a specification.

The object of my invention is to produce a machine by means of which the ears of corn, or other similar crop, may be automatically removed from the standing stalk by an upwardly directed blow delivered to the butt of the ear, mechanism being provided, however, to insure the proper passage through the machine of those stalks which may be accidentally uprooted or broken at the points below the ears.

The accompanying drawings illustrate my invention.

Figure 1 is a front perspective of the picker portion of a machine embodying my invention, with one of the shields removed to show the gathering and retarding chains; Fig. 2 a side elevation, and Fig. 3 a fragmentary section on line 3—3 of Fig. 2.

In the drawings, 10 indicates a main frame supported in part upon a bull wheel 11 carrying a driving sprocket 12. The frame 10, at its forward end, carries a pair of downwardly and forwardly inclined supplemental frames 13 and 14 which are separated from each other enough to form a clear passage between them for a single row of standing stalks. Journaled at the upper and inner corner of each of the frames 13 and 14 is a knocking roller 15, the two rollers being separated from each other by an average thickness of a corn stalk, and each of these rollers 15 is provided with longitudinally knocking ribs 16. Each roller 15 is provided at its lower end with a tapered portion 15' which together form a gradually narrowing throat leading to the space between the two rollers. The two rollers 15 are connected by suitable gears 17 for opposite rotation and said rollers are driven in any suitable manner in such direction that their adjacent portions will move upwardly, as indicated by the arrows in Fig. 3. The rollers may be driven in any desirable manner, as for instance by means of a chain 18 passing over sprocket 12 and on to a sprocket carried by a countershaft 19; a sprocket wheel 21, a chain 22 passing over a sprocket wheel carried by another countershaft 23 (Fig. 2) and hidden behind a bevel gear 24 which meshes with a bevel pinion 25 carried by the shaft of one of the rollers 15.

Arranged at the lower end of each of the frames 13 and 14 is a gathering chain 31 which passes over suitable idlers 32, 32 and a driving sprocket 33, and each of these chains is provided with gathering fingers 34 which, at the adjacent edges of the two frames 13 and 14, project toward each other and slightly overlap. These chains are of an ordinary type and are driven in such manner that the rearward movement of the fingers 34 will be just a little greater in speed than the speed of forward movement of the machine as a whole so that, when the standing stalks are first engaged by these fingers 34, they will be moved rearwardly relative to the ground, the operation being such that standing stalks will be bent backward slightly and stalks which are lying down will be raised upright. The fingers 34 of chains 32 are withdrawn from the space between the two frames 13 and 14 at about the time the forward ends of the rollers 15 come opposite the stalks delivered by the fingers 34 and, as it is desirable that the upward blow of the knocking ribs 16 be as nearly as possible in alinement with the stalk so as to exert the greatest pulling effect upon the stem of the ear, I provide a retarding chain 35 similar to the chain 31 and provided with fingers 36. This chain is supported upon idlers 37, 37 so that its fingers may be projected across and travel upwardly along the space between the rollers 15, and the chain 35 also passes over a driving sprocket 38 which is driven at such speed that the upward and rearward movement of the fingers 36 will be somewhat slower than the forward movement of the machine as a whole so that the fingers 36 will thus operate to bend the upper end of the stalk forwardly, as the machine advances, as indicated in Fig. 2, so that, before the upper ends of the rollers 15 are brought opposite any particular stalk, the upper end of that stalk will be practically at right angles to the axis of the rollers.

Any suitable driving train may be provided for driving the several finger chains and in the present case I have shown a countershaft 41 which is driven by a bevel pinion (not shown) meshing with pinion 24. The shaft 41 carries a sprocket 42 over which chain 43 passes to a sprocket 44 connected to a sprocket 33. Shaft 41 also carries a gear 45 meshing with a gear 46 on the shaft which carries a sprocket wheel 47 over which a chain 48 passes to a sprocket wheel 49 which, in turn, is connected with a sprocket wheel 51 over which the chain 52 passes to the driving sprocket which supports the chain 31 on the frame 14. The entire driving train for these chains is not shown because the gathering chains 31 and the means for driving the same are well known to all persons ordinarily familiar with this type of machine.

It sometimes happens that the stalks are broken and in that case there would be an accumulation of broken stalks at the upper end of the rollers 15 in such manner as to interfere with proper operation. In order to avoid this difficulty, I have mounted below each roller 15 a pulling roller 61 which, at its forward end is provided with a tapered portion 62 carrying gathering flanges or worms 63. The rollers 61 are considerably shorter than rollers 15 and lie below the upper ends of said rollers 15, being geared together and to the rollers 15 in such manner as to have their adjacent portions moved downwardly. The circumferences of these two rollers lie somewhat closer to each other than the rollers 15 so that the throat between the rollers 61 is less than the average stalk thickness and said rollers are provided with gripping ribs 64, the arrangement being such that, when the gathering flanges 63 of rollers 61 are brought opposite a standing stalk or opposite the downwardly projecting end of a broken stalk lying between the rollers 15, the said stalk is drawn rearwardly by the gathering flanges and driven into the space between the pulling rollers, whereupon said pulling rollers serve to draw the upper end of the stalk positively down between the knocking rollers thus insuring a proper knocking action of the knocking rollers upon the ears of the stalks.

It will be readily understood that the apparatus which I have described may be adapted for use in connection with any similar standing crop in which the desired fruit is attached thereto by a breakable stem, and in the specification and claims I have used the term "corn" as sufficiently general to mean other than maize.

I claim as my invention:

1. In a corn picker, the combination of means for delivering an upward blow to the corn ears, means for engaging the upper ends of the corn stalks to move the same forwardly with the machine, and means for engaging the stalk below said blow-delivering means to pull the stalk downwardly past the blow-delivering means.

2. In a corn picker, the combination of means for delivering an upward blow to the corn ears, means for engaging the upper ends of the corn stalks to move the same forwardly with the machine but at a slower rate, and means for engaging the stalk below said blow-delivering means to pull the stalk downwardly past the blow-delivering means.

3. In a corn picker, the combination of a vehicle, means carried thereby for delivering an upward blow to the corn ears upon standing stalks, and means carried by the vehicle for engaging the upper ends of the corn stalks to move the same forwardly with the machine but at a slower rate.

4. In a corn picker, the combination of a vehicle, means carried thereby for delivering an upward blow to the corn ears upon standing stalks, and means carried by the vehicle for engaging the upper ends of the corn stalks to move the same forwardly with the machine prior to and substantially until such blow is delivered.

5. In a corn picker, the combination of a pair of downwardly and forwardly inclined knocking rollers provided with means for delivering an upward blow to the corn ears between the rollers, means for driving the said rollers upwardly at their adjacent portions, gathering chains arranged in advance of the knocking rollers, means for driving said gathering chains at a speed greater than the forward movement of the machine, and means for engaging the upper end of a stalk after it is within the range of action of the knocking rollers to bend the upper end of said stalk forwardly.

6. In a corn picker, the combination of a pair of downwardly and forwardly inclined knocking rollers provided with means for delivering an upward blow to the corn ears between the rollers, means for driving the said rollers upwardly at their adjacent portions, gathering chains arranged in advance of the knocking rollers, means for driving said gathering chains at a speed greater than the forward movement of the machine, a retarding chain arranged above the crotch between the knocking rollers, and means for driving said retarding chain at a speed less than the forward speed of the machine.

7. In a corn picker, the combination of a pair of downwardly and forwardly inclined knocking rollers provided with means for delivering an upward blow to the corn ears between the rollers, means for driving the said rollers upwardly at their adjacent portions, gathering chains arranged in advance of the knocking rollers, means for driving said gathering chains at a speed greater than the forward movement of the machine, means for engaging the upper end of a stalk after it is within the range of action of the knocking rollers to bend the upper end of said stalk forwardly, a pair of pulling rollers arranged beneath the knocking rollers, and means for driving said pulling rollers downwardly at their adjacent portions.

8. In a corn picker, the combination of a pair of downwardly and forwardly inclined knocking rollers provided with means for delivering an upward blow to the corn ears between the rollers, means for driving the said rollers upwardly at their adjacent portions, gathering chains arranged in advance of the knocking rollers, means for driving said gathering chains at a speed greater than the forward movement of the machine, a retarding chain arranged above the crotch between the knocking rollers, means for driving said retarding chain at a speed less than the forward speed of the machine, a pair of pulling rollers arranged beneath the knocking rollers and means for driving said pulling rollers downwardly at their adjacent portions.

In witness whereof, I have hereunto set my hand and seal at La Fayette, Indiana, this 22nd day of April, A. D. one thousand nine hundred and eleven.

BURT J. KAULL. [L. S.]

Witnesses:
RICHARD CARPENTER,
GRACE D. VAN CAMP.